(12) United States Patent
Le Leannec et al.

(10) Patent No.: US 8,813,157 B2
(45) Date of Patent: Aug. 19, 2014

(54) METHOD AND DEVICE FOR DETERMINING THE VALUE OF A DELAY TO BE APPLIED BETWEEN SENDING A FIRST DATASET AND SENDING A SECOND DATASET

(71) Applicant: Canon Kabushiki Kaisha, Tokyo (JP)

(72) Inventors: Fabrice Le Leannec, Mouaze (FR); Patrice Onno, Rennes (FR); Xavier Henocq, Melesse (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/684,940

(22) Filed: Nov. 26, 2012

(65) Prior Publication Data

US 2013/0086621 A1 Apr. 4, 2013

Related U.S. Application Data

(63) Continuation of application No. 12/674,415, filed as application No. PCT/EP2008/064478 on Oct. 24, 2008, now Pat. No. 8,347,342.

(30) Foreign Application Priority Data

Oct. 26, 2007 (FR) ...................... 07 07545

(51) Int. Cl.
*H04N 7/173* (2011.01)

(52) U.S. Cl.
USPC .......................................... 725/116; 725/94

(58) Field of Classification Search
USPC .................................. 725/94, 116
See application file for complete search history.

(56) References Cited

U.S. PATENT DOCUMENTS

| | | | |
|---|---|---|---|
| 7,095,782 B1 | 8/2006 | Cohen | |
| 7,397,958 B2 | 7/2008 | Le Leannec | |
| 7,426,305 B2 | 9/2008 | Denoual | |
| 7,610,334 B2 | 10/2009 | Henocq | |
| 2005/0114386 A1 | 5/2005 | Nassor | |

(Continued)

FOREIGN PATENT DOCUMENTS

WO 2005/079070 8/2005

OTHER PUBLICATIONS

T. Wiegand, et al., "Scalable Video Coding-Joint Draft 10 of SVC Amendment", Joint Video Team (JVT) or ISO/IEC MPEG & ITU-T VCEG, San Jose, California, Apr. 2007 (JVT-W201).

G. Sullivan, et al., "Text of ISEOC/IEC 14496-10 Advanced Video Coding 3rd Edition", ISO/IEC JTC 1/SC 29/WG 11, Richmond, WA, USA, Jul. 2004.

(Continued)

*Primary Examiner* — Jivka Rabovianski
(74) *Attorney, Agent, or Firm* — Fitzpatrick, Cella, Harper & Scinto

(57) ABSTRACT

The invention relates to a method and to a device for determining the value of a delay to be applied between sending a first dataset and sending a second dataset, the data being representative of a sequence of coded images, the datasets consisting of data subsets, the coded images being coded according to a first level of resolution and at least a second level of resolution higher than the first level of resolution, the data subsets containing data of a first level of resolution. According to the invention:

first and second datasets are obtained (E506); and
the value of the delay is determined (E507), the value of the delay being dependent on the number of decoded images that can be formed from the data subsets of the first dataset which contain data of the second or of a second level of resolution.

11 Claims, 7 Drawing Sheets

(56) References Cited

U.S. PATENT DOCUMENTS

| | | |
|---|---|---|
| 2005/0158026 A1 | 7/2005 | Shin |
| 2005/0198676 A1 | 9/2005 | Henocq |
| 2006/0256851 A1 | 11/2006 | Wang |
| 2009/0060035 A1* | 3/2009 | He et al. .................. 375/240.12 |
| 2009/0097483 A1 | 4/2009 | Henocq |
| 2009/0135818 A1 | 5/2009 | Onno |
| 2009/0210765 A1 | 8/2009 | Henocq |
| 2009/0285306 A1* | 11/2009 | Leonardi et al. ......... 375/240.18 |
| 2010/0205514 A1 | 8/2010 | Henocq |

OTHER PUBLICATIONS

Peng Chen, et al., "A network-adaptive SVC Streaming Architecture", Information and Communications University, Feb. 1, 2007.

Hyukjune Chung, et al., Test Conditions for the FGS Applications and Design Simplification AhG, FGS applications and design simplification AhG, Jun. 27, 2007.

Alex Eleftheriadis, et al., Improved Error Resilience using Temporal Level O Picture Index, Layered Media, Inc., Apr. 27, 2007.

Ye-Kui Wang, et al., "On SVC high-level syntax", Nokia and TUT., Jan. 14, 2007.

\* cited by examiner

| | 710 | 712 | 714 | 715 |
|---|---|---|---|---|
| 720 | NAL⁰_I⁰(t0,l0) | Cpt_im(l0)=1 | Cpt_im(l1)=0 | |
| 722 | NAL⁰_I⁰(t0,l1) | Cpt_im(l0)=1 | Cpt_im(l1)=1 | 0 |
| 724 | NAL¹_I⁰(t0,l1) | Cpt_im(l0)=1 | Cpt_im(l1)=1 | |
| 726 | NAL⁰_P¹(t0,l0) | Cpt_im(l0)=2 | Cpt_im(l1)=1 | 1 |
| 728 | NAL⁰_P¹(t0,l1) | Cpt_im(l0)=2 | Cpt_im(l1)=2 | 0 |
| 730 | NAL⁰_B²(t0,l0) | Cpt_im(l0)=3 | Cpt_im(l1)=2 | |

Fig. 7

METHOD AND DEVICE FOR DETERMINING THE VALUE OF A DELAY TO BE APPLIED BETWEEN SENDING A FIRST DATASET AND SENDING A SECOND DATASET

This application is a continuation of application Ser. No. 12/674,415, filed Feb. 19, 2010 (allowed), which is a §371 of International Application No. PCT/EP2008/064478, filed Oct. 24, 2008.

The present invention relates to a method for determining the value of a delay to be applied between sending a first dataset and sending a second dataset.

In video stream transmission systems, it is necessary for a video server to time the sending of the data to a receiving device so that the receiving terminal has the data at the moment when they have to be decoded or reproduced.

If the video server sends the data well before they have to be produced, the receiving device must have a large memory in order to store the data before they are reproduced.

The MPEG-4 ISO file format dedicated to SVC delivers temporal information helping to determine the moments when the data must be sent. This file format is currently in the process of being standardized: "ISO/IEC 14496-15/FPDAM 2 (SVC File Format)", D. Singer, M. Z. Visharam, Y. K. Wang and T. Rathgen, MPEG-4/Systems, MPEG document number N9283.

When the file format does not deliver temporal information, it is difficult to time the sending of the data.

In addition, new coding formats allow image sequences to be coded according to various levels of resolution. This is for example the case for the coding format called SVC coding and described in the document by T. Wiegand, G. Sullivan, J. Reichel, H. Schwarz and M. Wien, "*Scalable Video Coding—Joint Draft* 10 *of SVC Amendment (revision* 2*)*", Joint Video Team (JVT) of ISO/IEC MPEG & ITU-T VCEG, San Jose, Calif., April 2007. Document JVT-W201.

These various levels of resolution make the timing for sending data complicated.

The object of the invention is to solve the drawbacks of the prior art by proposing a method and a device that are capable of determining at what instant the data of a video sequence coded according to various levels of resolution must be sent, without the coding format for the coded video sequence necessarily including time stamps for timing the sending of the data.

For this purpose, according to a first aspect, the invention proposes a method for determining the value of a delay to be applied between sending a first dataset and sending a second dataset, the data being representative of a sequence of coded images, the datasets consisting of data subsets, the coded images being coded according to a first level of resolution and at least a second level of resolution higher than the first level of resolution, the data subsets containing data of a level of resolution, characterized in that the method comprises the steps of:
obtaining the first and second datasets; and
determining the value of the delay, the value of the delay being dependent on the number of decoded images that can be formed from the data subsets of the first dataset which contain data of the second or of a second level of resolution.

Correspondingly, the present invention relates to a device for determining the value of a delay to be applied between sending a first dataset and sending a second dataset, the data being representative of a sequence of coded images, the datasets consisting of data subsets, the coded images being coded according to a first level of resolution and at least a second level of resolution higher than the first level of resolution, the data subsets containing data of a first level of resolution, characterized in that the device comprises:
means for obtaining the first and second datasets; and
means for determining the value of the delay, the value of the delay being dependent on the number of decoded images that can be formed from the data subsets of the first dataset which contain data of the second or of a second level of resolution.

Thus, it is possible to determine at what instant the datasets of a sequence of coded images must be sent without the coding format for the sequence of coded images including time stamps that allow the sending of the data to be timed.

In addition, since the value of the delay is dependent on the number of images decoded, it is possible to time the transmission of the datasets for a sequence of images coded according to several levels of resolution.

According to one particular embodiment of the invention, the value of the delay is dependent on the number of decoded images that can be formed from the data subsets of the first dataset which contain data of the first level of resolution.

Thus, it is possible to determine at what instant the datasets of a sequence of images coded according to various levels of resolution must be sent without the coding format for the sequence of coded images including time stamps that allow the sending of the data to be timed.

According to one particular embodiment of the invention, the value of the delay is furthermore dependent on the maximum rate of reproduction of the decoded images on a display means.

Thus, since the timing for sending the datasets is matched to the rate of reproduction of the decoded images, the device that receives the datasets does not necessarily have to have a large memory allocated to storing the data.

According to one particular embodiment of the invention, the levels of resolution are levels of spatial or quality resolution and in that the value of the delay is dependent on the number of decoded images that can be formed from the data subsets of the first dataset which contain data of the second or of a second level of spatial or quality resolution.

Thus, it is possible to determine at what instant the datasets of a sequence of images coded according to various levels of resolution must be sent without the coding format for the sequence of coded images including time stamps that allow the sending of the data to be timed.

According to one particular embodiment of the invention, the data subsets of each dataset are ordered and the value of the delay is a minimum if the first data subset included in the second dataset contributes to the formation of the same decoded image as the first data subset included in the first dataset.

Thus, when various datasets contain data which contribute to the formation of the same decoded image, the receiver of the datasets rapidly has available the dataset needed to form the decoded image.

According to one particular embodiment of the invention, the device for determining the value of a delay to be applied between sending a first dataset and sending a second dataset:
detects each data subset of the first dataset containing data contributing to the formation of an image for which the previous data subsets do not contribute to the formation; and
for each data subset detected, increments the value of a counter associated with the level of resolution of the data contained in the subset detected, and the value of the delay is dependent on the number of decoded images that can be formed from the subsets of the first dataset which contain data of the level of resolution of which the associated counter has the maximum value.

Thus, the present invention is simple to implement.

According to one particular embodiment of the invention, the sequence of coded images is decomposed into first and second groups of coded images, the first and second datasets containing data representative of the first group of coded images, and the device for determining the value of a delay to be applied between sending a first dataset and sending a second dataset:

obtains a third dataset; and if the data contained in the third dataset are representative of the first group of images, determines the value of the delay to be applied between sending the second dataset and sending the third dataset or, if the data contained in the third dataset are representative of the second group of images, determines the value of the delay to be applied between sending the first dataset and sending the third dataset.

Thus, the present invention is particularly well suited to video coding formats in which the images are coded by groups of images.

According to one particular embodiment of the invention, the sequence of coded images is furthermore coded according to a first level of temporal resolution and at least one second level of temporal resolution higher than the first level of temporal resolution and, if the data contained in the third dataset are representative of the second group of images, the value of the delay to be applied between sending the first dataset and sending the third dataset is a function of the first level of temporal resolution.

Thus, the present invention is suitable for situations in which the levels of resolution are modified between two groups of transferred images.

The invention also relates to a computer program stored on an information medium, said program containing instructions for implementing the method described above, when said program is loaded into and executed by a data processing system.

The abovementioned features of the invention, as well as others, will become more clearly apparent on reading the following description of an exemplary embodiment, said description being given in relation to the appended drawings in which:

FIG. 7 is a table showing an example of datasets made up respectively of at least one data subset and of image counters used by the present invention.

Figure 1:
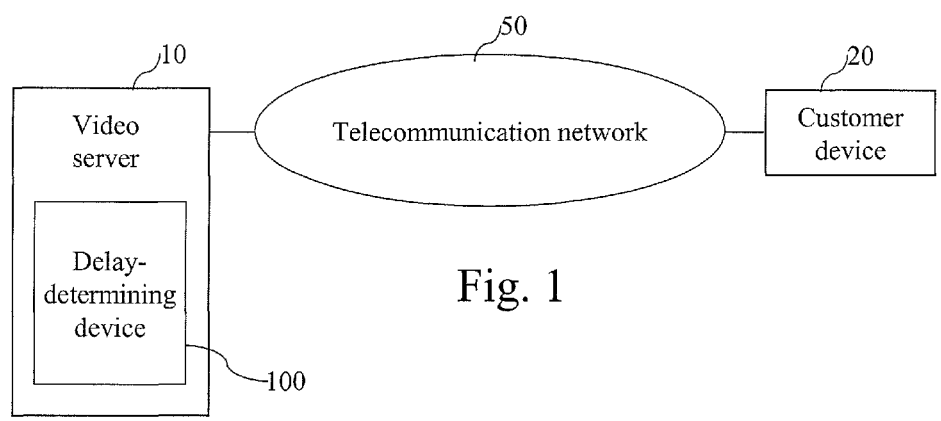
FIG. 1 shows a telecommunication system in which the present invention is implemented.

In FIG. 1, a video server 10 transmits data to a receiving device 20 via a telecommunication network 50. The telecommunication network 50 is for example an 802.11a or b or g wireless network or an Ethernet network, or an Internet network. The video server 10 transmits consecutive datasets with a delay determined by a device 100 for determining a delay to be applied between the sending of two datasets.

The device 100 for determining a delay to be applied between the sending of two datasets is preferably included in the video server 10. The receiving device 20 is a customer 20 of the video server 10. In an alternative embodiment, the device 100 for determining a delay to be applied between the sending of two datasets is separate from the video server 10.

Upon receiving a request transmitted by the receiving device 20 and deduced from an operation of the user of the receiving device 20, the device 100 for determining a delay to be applied between the sending of two datasets determines the parameters for extracting at least one portion of a video sequence to be transmitted.

The request is for example a request in accordance with the RTSP protocol, RTSP standing for real-time streaming protocol.

The video sequence is for example a video sequence coded according to the coding method as proposed in the document by T. Wiegand, G. Sullivan, J. Reichel, H. Schwarz and M. Wien, "*Scalable Video Coding—Joint Draft* 10 *of SVC Amendment (revision* 2)", Joint Video Team (JVT) of ISO/IEC MPEG & ITU-T VCEG, San Jose, Calif., April 2007. Document JVT-W201.

The video sequence coded according to this method takes the form of a binary stream called hereafter SVC bitstream.

According to the invention, the device 100 for determining a delay to be applied between the sending of two datasets extracts data subsets corresponding to the request, encapsulates the data subsets in datasets, determines the delay to be applied between transferring each dataset, and sends the datasets to the receiving device 20 according to the delays determined.

In the case of SVC coding, a data subset is called an NAL, the acronym for network abstract layer. An NAL is the elementary element of the SVC bitstream.

An NAL includes a header and a field comprising either coding parameters for the coded video sequence or data representative of an image of the coded video sequence, or data representative of a portion of an image of the coded video sequence.

An NAL is different from data of the MPEG 4 type in that it does not contain meta-data within the MPEG4 file format dedicated to containing SVC video streams, as described in the document "ISO/IEC 14496-15/FPDAM 2 (SVC File Format)" D. Singer, M. Z. Visharam, Y. K. Wang and T. Rathgen, MPEG-4/Systems, MPEG document number N9283.

In the case of SVC coding, a dataset is a set containing at least one NAL. The size, in terms of number of bytes, of each dataset is adjusted so that it is smaller than a predetermined value. This predetermined value is for example a function of a quantity representative of the telecommunication network 50. This quantity is for example the MTU (maximum transfer unit) size, which is defined as the maximum size of a packet before fractionation of said packet by the devices making up the telecommunication network 50.

The datasets are preferably transferred in packet form according to the RTP protocol, RTP standing for real-time transport protocol.

The SVC coding provides a video representation with coding over levels of resolution, or scalable coding, according to a quality dimension, a temporal dimension and a spatial dimension.

A level of quality resolution corresponds to a given quality, for example obtained from a data quantization step.

The lowest level of quality resolution corresponds to the lowest quality and the highest level of quality resolution corresponds to the highest quality.

A level of spatial resolution corresponds to a given number of pixels reproduced after decoding.

The lowest level of spatial resolution corresponds to the smallest number of pixels reproduced after decoding, while the highest level of spatial resolution corresponds to the largest number of pixels reproduced after decoding.

A level of temporal resolution corresponds to a given number of decoded images reproduced per second.

The lowest level of temporal resolution corresponds to the smallest number of decoded images reproduced per second, while the highest level of temporal resolution corresponds to the largest number of decoded images reproduced per second. A given level of temporal resolution greater than 0 is formed by interleaving images at time instants located between those of the images of the lower level of temporal resolution.

An SVC bitstream, i.e. SVC-coded video, includes a base layer or lowest level of resolution compatible with the H.264 format, above which one or more refinement layers or higher levels of resolution may be coded according to one of the three dimensions.

These refinement layers correspond to levels of quality or temporal or spatial resolution.

Figure 2:
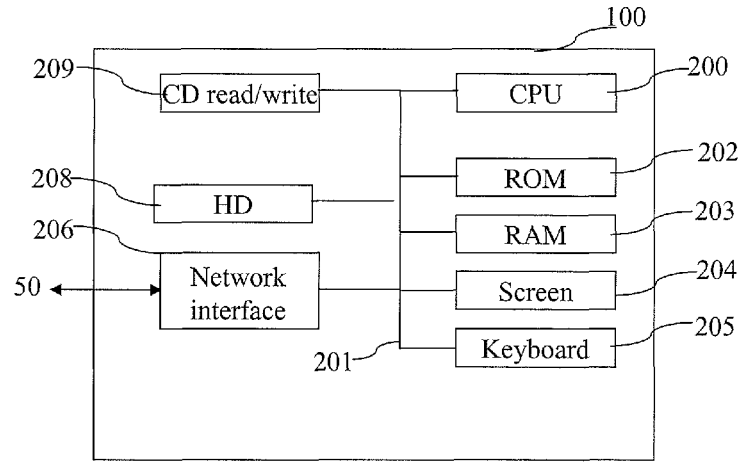
FIG. 2 shows a device for determining a delay to be applied between the sending of two datasets according to the present invention.

FIG. 2 shows a device for determining a delay to be applied between the sending of two datasets according to the present invention.

The device 100 for determining a delay to be applied between the sending of two datasets is for example a computer comprising a communication bus 201 to which the following are connected: a central processing unit CPU 200; a read-only memory ROM 202; a random-access memory RAM 203; a screen 204; a keyboard 205; a network interface 206 for interfacing with the telecommunication network 50; a hard disk HD 208; and a CD read/write device 209 for reading and writing data on a removable medium.

It should be pointed out here that, as a variant, the device 100 for determining a delay to be applied between the sending of two datasets consists of one or more dedicated integrated circuits capable of implementing the method as described with reference to FIG. 6 or to FIGS. 8a and 8b. These integrated circuits are for example, but not limitingly, integrated into a video sequence acquisition apparatus or video server 10.

The read-only memory ROM 202 stores inter alia the program for implementing the method of the invention, which will be described later with reference to FIG. 6 or to FIGS. 8a and 8b.

More generally, the program according to the present invention is stored in a storage means. This storage means can be read by a computer or a microprocessor 200. This storage means may or may not be integrated into the device 100 for determining a delay to be applied between the sending of two datasets, and may be removable.

When the device 100 for determining a delay to be applied between the sending of two datasets is turned on, or when the software for determining a delay to be applied between the sending of two datasets is started, the program according to the present invention is transferred from the read-only memory ROM 202 to the active-memory RAM 203 which then contains the executable code of the invention and also the data needed to implement the invention.

The device 100 for determining a delay to be applied between the sending of two datasets also includes a screen 204.

The network interface 206 allows requests from the receiving device 20 to be received via the telecommunication network 50.

The network interface 206 allows the datasets to be transmitted via the telecommunication network 50 to the receiving device 20.

The hard disk 208 stores the datasets to be transmitted. The hard disk 208 also stores, as a variant, the program for implementing the invention, which will be described later with reference to FIG. 6 or to FIGS. 8a and 8b.

The reader/writer 209 for reading/writing data on a removable memory means is for example a compact disc reader/writer. The data reader/writer 209 is capable of reading the program according to the present invention in order to transfer it onto the hard disk 208. The data reader/writer 209 is also capable of reading the datasets to be transferred according to the present invention.

Figure 3:
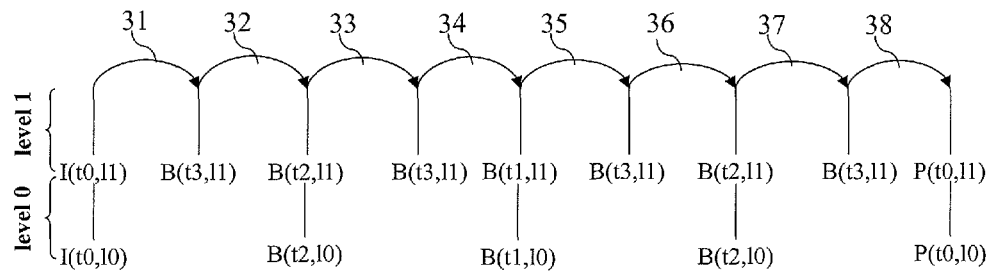
FIG. 3 shows the order in which the images of a coded image sequence are displayed at the receiving device.

FIG. 3 shows the order in which a sequence of coded images is displayed at the receiving device.

In FIG. 3, two levels of spatial or quality resolution, namely a level 0 and a level 1, are shown.

The spatial or quality level of resolution 0, also called the base level, represents a sequence of coded images with its lowest level of spatial or quality resolution and is compressed so as to be compatible with the H264/AVC standard as described in the document by G. Sullivan, T. Wiegand and A. Luthra entitled "*Text of ISO/IEC 14496 10 Advanced Video Coding 3rd Edition*", ISO/IEC JTC 1/SC 29/WG 11, Redmond, Wash., USA, July 2004.

The level of spatial or quality resolution 0 is made up of images of type I, P and B. The B images are denoted by $B(t_i,l0)$. An image $B(t_i,l0)$ is temporally predicted from the anchoring images $I(t0,l0)$ or $P(t0,l0)$ surrounding it, and also from the images $B(t_j,l0)$ where $j<i$, which are located within the same interval of anchoring images $I(t0,l0)$ or $P(t0,l0)$. The level of spatial or quality resolution 0 thus consists of the images $I(t0,l0)$, $B(t2,l0)$, $B(t1,l0)$, $B(t2,l0)$ and $P(t0,l0)$ where l0 represents the level of spatial or quality resolution 0 and ti represents the level of temporal resolution, with i=0 to 2.

The level of spatial or quality resolution 1 is a level of spatial or quality resolution higher than the level of spatial or quality resolution 0. The level of spatial or quality resolution 1 is coded predictively with respect to the level of spatial or quality resolution 0. In particular in the case of a level of spatial resolution 1, a spatial oversampling step takes place during these predictions between levels of resolution, this step also being called inter-layer prediction. The level of spatial or quality resolution 1 thus consists of the images $I(t0,l1)$, $B(t2,l1)$, $B(t1,l1)$, $B(t2,l1)$ and $P(t0,l1)$ where l1 represents the level of spatial or quality resolution 1 and ti represents the level of temporal resolution, with i=0 to 3. The level of spatial or quality resolution 1 furthermore includes the images of the level of temporal resolution 3, which are denoted by $B(t3,l1)$.

The arrows denoted by 31 to 38 represent the order in which this sequence of coded images is displayed by the receiving device 20.

Figure 4:
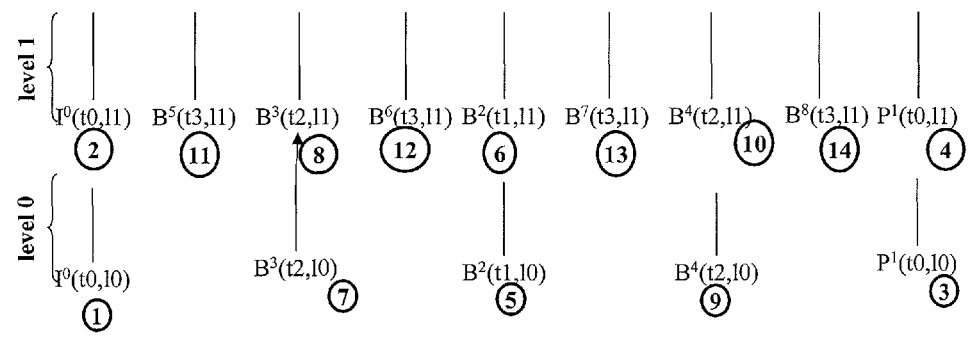
FIG. 4 shows the order in which the images of a coded image sequence are transmitted by a video server.

FIG. 4 shows the order in which the images of a sequence of coded images is transmitted by a video server.

FIG. 4 shows the images of a group of images, conventionally called a GOP (group of pictures), of an SVC coded image sequence.

The SVC coded image sequence contains two levels of spatial or quality resolution, namely level 0 and level 1. The coded image sequence is identical to that shown in FIG. 3.

As already mentioned above with reference to FIG. 3, an image is denoted by its type, its level of temporal resolution and its level of spatial or quality resolution to which it belongs.

Thus, $B^k(t2,l1)$ represents an image of type B, with a level of temporal resolution 2 and belonging to the level of spatial or quality resolution 1, in which k is an index that identifies the images of the same level of spatial or quality resolution.

The order in which the images of a GOP are transmitted appears within the level of spatial or quality resolution 0 and/or within the level of spatial or quality resolution 1.

This order is a function of the dependencies that exist between the images of a GOP of a coded image sequence that are such that the order of the images in the image sequence before coding is different from the order in which the images must be decoded in order to restore the image sequence in its reconstructed version.

According to the invention, the order in which the data subsets are transmitted corresponds to the order in which the transmitted data subsets are decoded. In addition, in order for an image to be decoded, it is necessary for all the data subsets for predicting the data of the image to be received and decoded beforehand.

Thus, the images of the coded image sequence are transmitted in the following order: $I^0(t0,l0)$, $I^0(t0,l1)$, $P^1(t0,l0)$, $P^1(t0,l1)$, $B^2(t1,l0)$, $B^2(t1,l1)$, $B^3(t2,l0)$, $B^3(t2,l1)$, $B^4(t2,l0)$, $B^4(t2,l1)$, $B^5(t3,l1)$, $B^6(t3,l1)$, $B^7(t3,l1)$ and $B^8(t3,l1)$.

In FIG. 4, each circle containing a number indicates the order of transmission of the image.

It should be pointed out here that the conventional time stamp present in the headers of the RTP packets does not reflect the order of transmission of the images according to the present invention.

Figure 5:
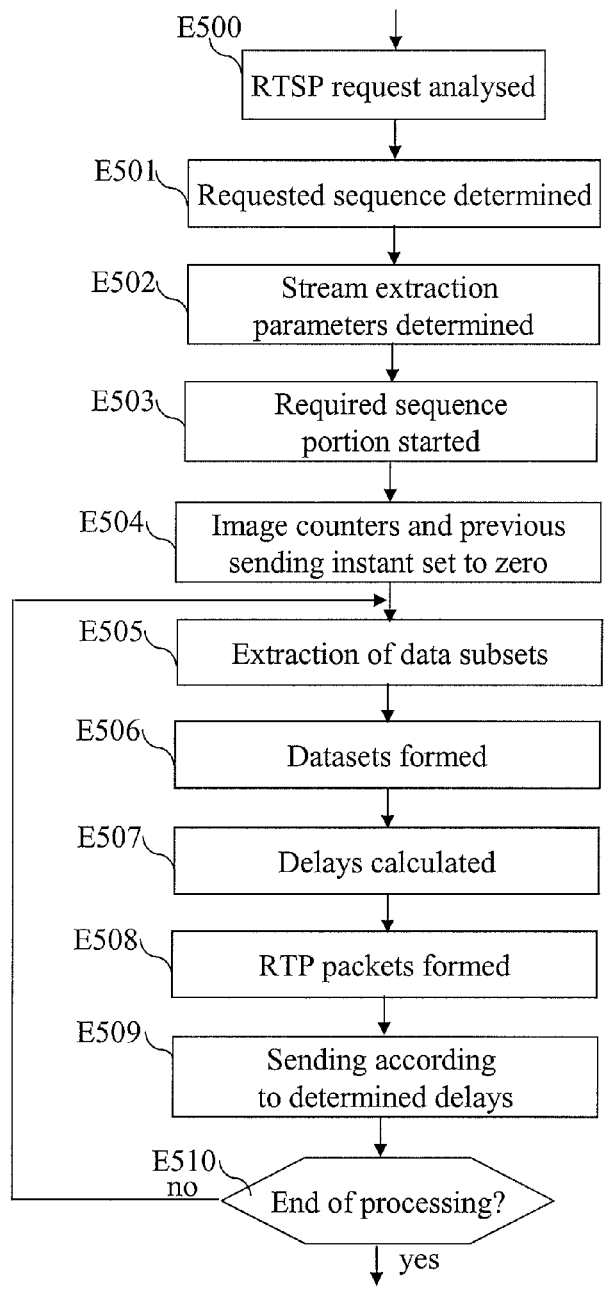
FIG. 5 shows an algorithm for transmitting datasets according to the present invention.

FIG. 5 shows an algorithm for transmitting datasets according to the present invention.

This algorithm is executed by the processor 200 of the device 100 for determining a delay to be applied between the sending of two datasets.

In step E500, the processor 200 detects the reception, via the network interface 50, of an RTSP request transmitted by the customer device 20.

In the next step E501, the processor 200 determines what the requested sequence of coded images is.

In the next step E502, the processor 200 determines the level of spatial and/or quality resolution and the temporal resolution requested in the RTSP request.

In the next step E503, the processor 200 is positioned at the start of the SVC bitstream corresponding to the coded image sequence determined.

In the next step E504, the processor 200 sets the image counters to the value zero. An image counter is associated with each level of spatial or quality resolution that is below or equal to the level corresponding to the RTSP request.

In the next step E505, the processor 200 extracts the data subsets or NALs from the SVC bitstream which correspond to the RTSP request.

In the next step E506, the processor 200 forms datasets containing the data subsets. The size of the datasets is adjusted so that it is below a predetermined value. This predetermined value is for example the MTU size.

In the next step E507, the processor 200 determines the value of the delay to be applied between the sending of two consecutive datasets. This step will be explained in greater detail with reference to FIG. 6 or with reference to FIGS. 8a and 8b.

In the next step E508, the processor 200 forms RTP packets from the datasets. These packets are in accordance with those described in the IETF document "*RTP Payload Format for SVC video—draft-ietf-avt-rtp-svc-01.txt*".

In the next step E509, the processor 200 transfers the packets formed from the datasets while respecting the delays determined.

In the next step E510, the processor 200 checks whether other data subassemblies are to be transferred.

If other data subsets are to be transferred, the processor 200 returns to step E505. If all the data subsets corresponding to the request received at step E500 have been transferred, the processor 200 stops the present algorithm and returns to step E500, awaiting a new RTSP request.

It should be pointed out here that this algorithm is interrupted when a new request is received from the same receiving device 20, which new request causes the processing of the current request to be interrupted. Such an interruption occurs for example when an RTSP pause or stop request is received by the video server 10 relating to the previously requested coded image sequence.

Figure 6:
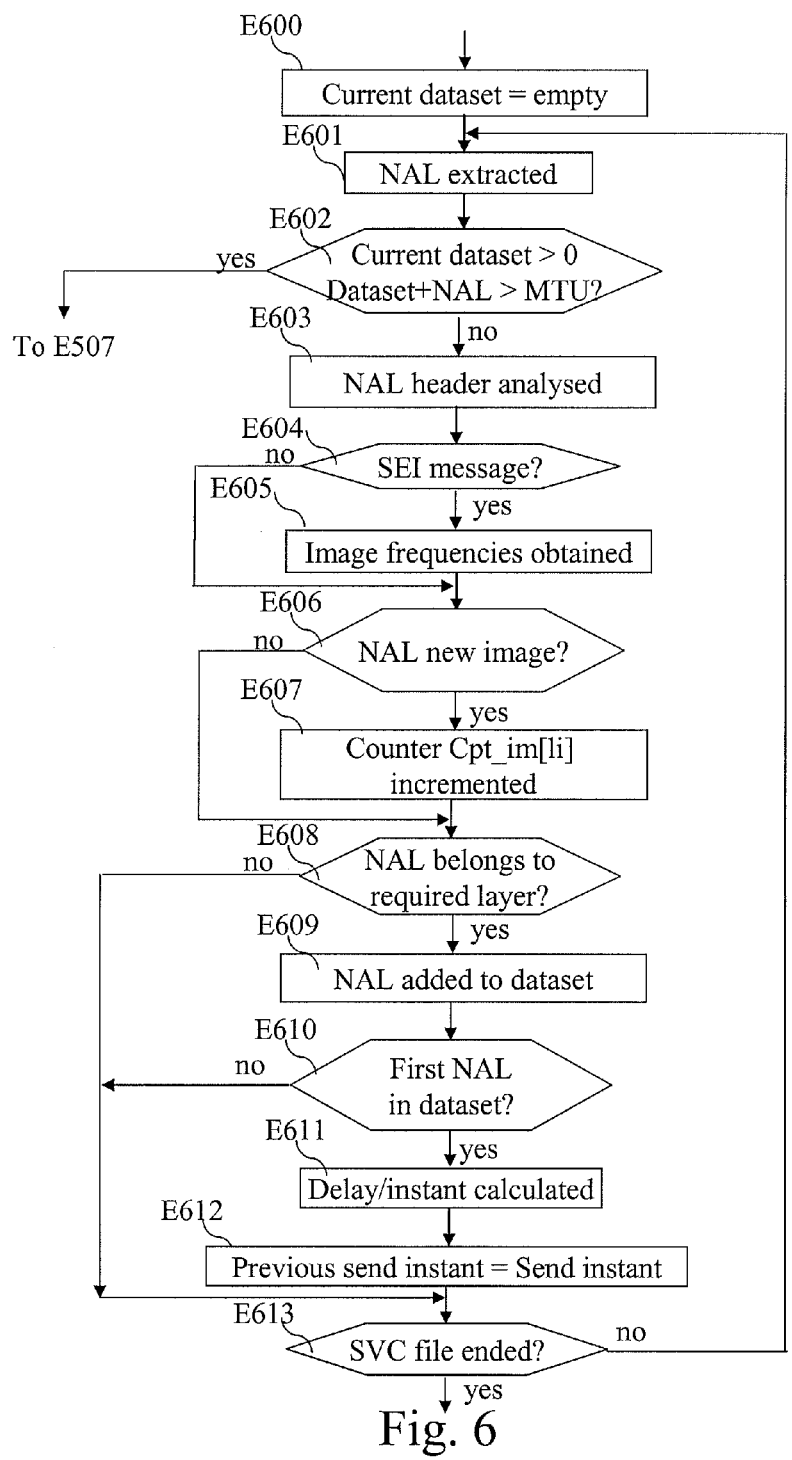
FIG. 6 shows an algorithm for determining a delay to be applied between the sending of two datasets according to a first embodiment of the present invention.

FIG. 6 shows an algorithm for determining a delay to be applied between the sending of two datasets according to a first embodiment of the present invention.

The algorithm of FIG. 6 describes in greater detail steps E505 and E506 of the algorithm of FIG. 5.

In step E600, the processor 200 sets the size of the dataset being formed to the value zero.

In the next step E601, the processor 200 extracts the data subset located at the current position in the SVC bitstream being processed, i.e. the coded image sequence being processed.

In the next step E602, the processor 200 checks whether the dataset being formed is non-zero and whether the sum of the size of the dataset being formed and the size of the extracted data subset is strictly greater than a predetermined value. The predetermined value is for example the MTU parameter of the telecommunication network 50.

If the dataset being formed is non-zero and if the sum of the size of the dataset being formed and the size of the extracted data subset is strictly greater than the predetermined value, it is not possible to add the extracted data subset to the dataset being formed. The processor 200 interrupts the algorithm of FIG. 6 and returns to step E507 of FIG. 5.

If the sum of the size of the dataset being formed and the size of the extracted data subset is equal to or less than the predetermined value, or if the dataset being formed is empty, the processor 200 passes to step E603.

In step E603, the processor 200 analyses the header of the extracted data subset. When the data subset is an elementary element of an SVC bitstream, the processor 200, in step E604, checks whether the header indicates an SEI (supplemental enhancement information) message and whether the SEI message contained in the subset corresponds to what is called the scalability information SEI message in the document by T. Wiegand, G. Sullivan, J. Reichel, H. Schwarz and M. Wien, "*Scalable Video Coding—Joint Draft 10 of SVC Amendment (revision 2)*", Joint Video Team (JVT) of ISO/IEC MPEG & ITU-T VCEG, San Jose, Calif., April 2007.

If the subset contains a scalability information SEI message, the processor 200 passes to step E605. Otherwise, the processor 200 passes to step E606.

In step E605, the processor 200 decodes the scalability information SEI message intended to describe the organization of the coded image sequence requested.

The scalability information SEI message contains inter alia information indicating the frequencies of images of each level of spatial or quality resolution contained in the coded image sequence requested by the receiving device 20 or, in other words, the levels of temporal resolution contained in the coded image sequence requested.

The decoding of this message provides a table of image frequency values for each level li of spatial or quality resolution, denoted by framerate[li].

In step E606, the processor 200 checks whether the extracted data subset contains data of a level of resolution that contributes to the formation of a new image during decoding of the coded image sequence.

If the extracted data subset contains data of a level of resolution that contributes to the formation of a new image during decoding of the coded image sequence, the processor 200 passes to step E607. Otherwise, the processor 200 passes to step E608.

In other words, the processor 200 detects whether the extracted data subset contains data contributing to the formation of an image for which the previous extracted data subsets did not contribute to the formation.

When the data subset is an elementary element of an SVC bitstream, the processor 200 verifies:
- if the data subset does not contain sequence parameters, or a sequence parameter set; and
- if the data subset does not contain image parameters or a picture parameter set; and
- if the data subset does not contain an SEI message supplying information about the next data subset in the bitstream; and
- if the data subset is different from the scalability information SEI message; and
- if the type of data subset is different from the "prefix NAL unit"; and
- if the quality index of the data subset is equal to zero.

The abovementioned parameters and messages are described in the document by T. Wiegand, G. Sullivan, J. Reichel, H. Schwarz and M. Wien, "*Scalable Video Coding—Joint Draft* 10 *of SVC Amendment* (*revision* 2)", Joint Video Team (JVT) of ISO/IEC MPEG & ITU-T VCEG, San Jose, Calif., April 2007.

In step E607, the processor 200 increments the value of a counter Cpt_im(li) associated with the level of spatial or quality resolution li of the data contained in the extracted data subset.

In step E608, the processor 200 checks whether the extracted data subset contains data of one of the levels of resolution required by the receiving device 20.

If the extracted data subset does not contain data of one of the levels of resolution required by the receiving device 20, the processor 200 passes to step E613. Otherwise, the processor 200 passes to step E609.

In step E609, the processor 200 inserts the extracted data subset into the dataset being formed, and then passes to step E610.

In step E610, the processor 200 checks whether the previously inserted data subset is the first data subset inserted into the dataset.

If the previously inserted data subset is not the first data subset inserted into the dataset, the processor 200 passes to step E613.

If the previously inserted data subset is the first data subset inserted into the dataset, the processor 200 passes to step E611.

In step E611, the processor 200 determines the value of the delay to be applied between the instant of transferring the previously formed dataset and the dataset being formed.

According to the invention, the value of the delay is dependent on the number of decoded images that can be formed from the data subsets contained in the previously formed dataset which contain data of the level of resolution or a level of resolution higher than the lowest level of resolution.

According to the invention, the value of the delay is dependent on the number of decoded images that can be formed from the data subsets contained in the previously formed dataset which contain data of the lowest level of resolution.

According to the invention, the value of the delay is furthermore dependent on the maximum rate of reproduction of the decoded images on a display means.

According to the invention, the data subsets of each dataset are ordered and the value of the delay is a minimum if the first data subset included in the dataset being formed contributes to the formation of the same decoded image as the first data subset contained in the previously formed dataset.

The value is a minimum when the second dataset is transferred as rapidly as possible after the end of transfer of the first data subset.

To do this, the delay is calculated according to the following equation:

$$\text{Delay} = \frac{\max\{\text{currentCpt\_im}[li]\} - \max\{\text{previousCpt\_im}[li]\}}{\max\{\text{framerate}[li]\}}$$

in which max{currentCpt_im[li]} is the maximum value of the image counters Cpt_im[li] of each level of resolution li of the dataset being formed, max{previousCpt_im[li]} is the maximum value of the image counters Cpt_im[li] of each level of resolution li, the value of which is taken at the first data subset of the previously formed dataset, and max{framerate[li]} is the maximum frame rate for images having the levels of spatial or quality resolution that are required by the customer.

The instant of sending is equal to the sum of the delay and of the instant of sending the previous dataset.

In the next step E612, the processor 200 stores the calculated instant of sending as being the previous instant of sending.

In the next step E613, the processor 200 checks whether the entire video stream has been processed. If the entire video stream has been processed, the processor 200 stops the present algorithm. Otherwise, the processor 200 returns to step E601.

FIG. 7 is a table showing an example of datasets made up respectively of at least one data subset and also the image counters used by the present invention.

Row 720 shows a first dataset made up of a data subset $NAL^0I^0(t0,l0)$ and the values of the image counters denoted by Cpt_im(l0) and Cpt_im(l1) for each level of spatial or quality resolution. The data subset $NAL^0I^0(t0,l0)$ contains the data of the image $I^0(t0,l0)$ of FIG. 4.

Rows 722 and 724 show a second dataset made up of data subsets $NAL^0I^0(t0,l1)$ and $NAL^1I^0(t0,l1)$ together with the values of the image counters Cpt_im(l0) and Cpt_im(l1). The data subsets $NAL^0I^0(t0,l1)$ and $NAL^1I^0(t0,l1)$ contain the data of the image $I^0(t0,l1)$ of FIG. 4.

The presence in an SVC bitstream of several NALs containing data of the same image occurs for example when it is decided to cut this image up into several slices during coding of this image.

One slice consists of a subset of successive macroblocks of the macroblocks of a coded image (see the document by T. Wiegand, G. Sullivan, J. Reichel, H. Schwarz and M. Wien, "*Scalable Video Coding—Joint Draft* 10 *of SVC Amendment (revision* 2)", Joint Video Team (JVT) of ISO/IEC MPEG & ITU-T VCEG, San Jose, Calif., April 2007).

Row 726 shows a third dataset made up of a data subset $NAL^0P^1(t0,l0)$ and the values of the image counters Cpt_im (l0) and Cpt_im(l1). The data subset $NAL^0P^1(t0,l0)$ contains the data of the image $P^1(t0,l0)$ of FIG. 4.

Rows 728 and 730 show a fourth dataset made up of data subsets $NAL^0P^1(t0,l1)$ and $NAL^0B^2(t0,l0)$ and also the values of the image counters Cpt_im(l0) and Cpt_im(l1). The data subsets $NAL^0P^1(t0,l1)$ and $NAL^0B^2(t0,l0)$ contain the data of the images $P^1(t0,l1)$ and $B^2(t0,l0)$ of FIG. 4, respectively.

Column 710 contains the indices of the abovementioned data subsets, column 712 contains the various values taken by the counter Cpt_im(l0), column 714 contains the various values taken by the counter Cpt_im(l1) and column 715 contains the various multiplicative factors of the inverse of the maximum frame rate for images having the levels of spatial or quality resolution that are required by the customer and calculated for determining the delays according to the present invention.

During formation of the first dataset, the counter Cpt_im (l0) is incremented since the image $I^0(t0,l0)$ has level of resolution 0.

During formation of the second dataset, the counter Cpt_im(l1) is incremented by one unit, since the data subset $NAL^0I^0(t0,l1)$ is the first data subset containing data of the image $I^0(t0,l1)$ of the level of resolution 1. The counter Cpt_im(l1) is not incremented by one unit a second time since the data subset $NAL^1I^0(t0,l1)$ is not the first data subset containing the data of image $I^0(t0,l1)$.

The value of the delay between transmitting the first and second datasets is zero since the data subset $NAL^0I^0(t0,l1)$ contained within the second dataset contributes to the formation of the same decoded image $I^0$ as the data subset $NAL^0I^0(t0,l0)$ contained in the first dataset. This is because the maximum values of the counters taken at each first data subset contained in the first and second datasets are identical. The multiplicative factor of the inverse of the maximum frame rate for images having the levels of spatial or quality resolution that are required by the customer is thus zero.

During formation of the third dataset, the counter Cpt_im (l0) is incremented by one unit, since the data subset $NAL^0P^1$ (t0,l0) is the first data subset containing data of the image $P^1(t0,l0)$ having level of resolution 0.

The value of the delay between transmitting the second and third datasets is dependent on the number of decoded images that can be formed from the subsets of the second dataset which contain the data of one of the levels of resolution, in this case level of resolution 0. The multiplicative factor of the maximum frame rate for images having the levels of spatial or quality resolution that are required by the customer is thus equal to the unit.

During formation of the fourth dataset, the counter Cpt_im (l1) is incremented by one unit, since the data subset $NAL^0P^1$ (t0,l1) is the first data subset containing data of the image $P^1(t0,l1)$ having level of resolution 1. The counter Cpt_im(l0) is incremented by one unit since the data subset $NAL^0B^2(t0, l0)$ is the first data subset containing the data of image $B^2(t0, l0)$.

The value of the delay between transmitting the third and fourth datasets is zero since the data subset $NAL^0P^1(t0,l1)$ contained in the fourth dataset contributes to the formation of the same decoded image $P^1$ as the data subset $NAL^0P^1(t0,l0)$ contained in the first dataset. This is because the maximum values of the counters taken at each first data subset, contained in the first and second datasets, are identical. The multiplicative factor of the maximum frame rate for images having the levels of spatial or quality resolution that are required by the customer is thus zero.

Figure 8A:
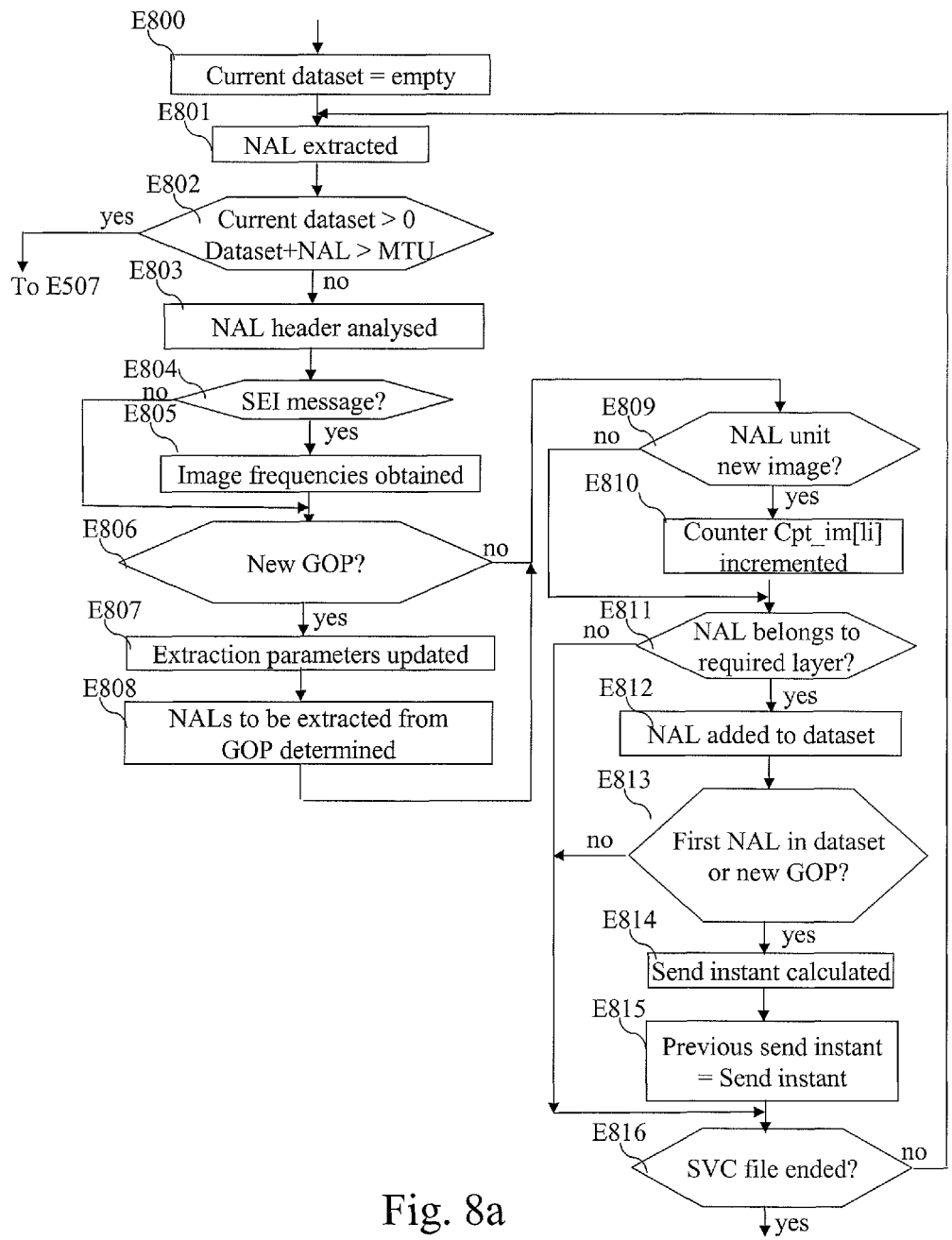
FIGS. 8a and 8b show an algorithm for determining a delay to be applied between the sending of two datasets according to a second embodiment of the present invention.
Figure 8B:
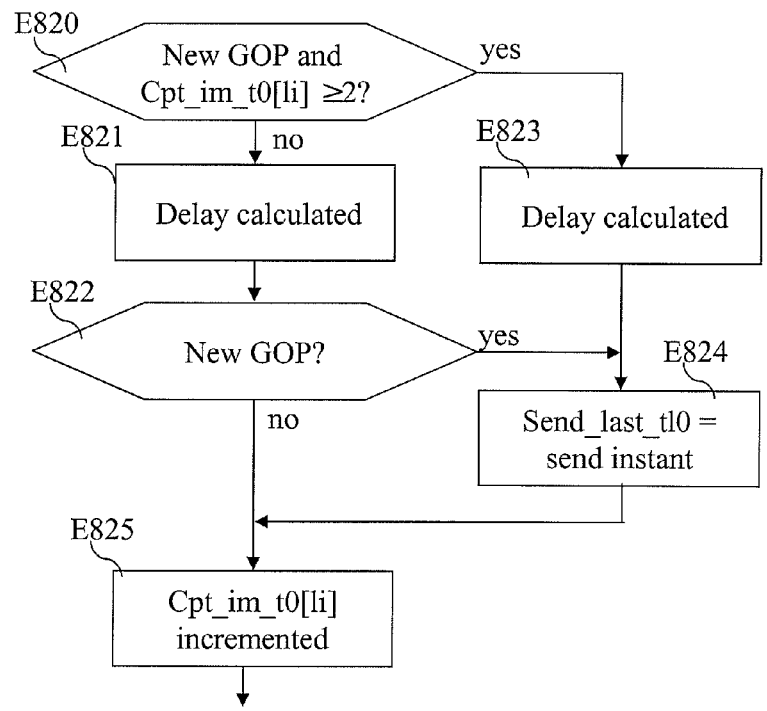

FIGS. 8*a* and 8*b* show an algorithm for determining a delay to be applied between the sending of two datasets according to a second embodiment of the present invention.

The algorithm of FIGS. 8*a* and 8*b* describes in greater detail steps E505 to E506 of the algorithm of FIG. 5 according to the second embodiment.

The algorithm of FIGS. 8*a* and 8*b* is particularly useful when the parameters for extracting the coded image sequence vary during the transmission process.

This is for example the case when the receiving device 20, following a user operation, modifies the parameters of the coded image sequence required, or when the various levels of resolution are used for the purpose of regulating the bit rate of the video server 10. In the latter case, it is necessary to determine, for each GOP of the SVC bitstream, the data subsets that allow the corresponding bit rate to comply with the required bandwidth.

The extraction parameters, such as the level of spatial and/or quality resolution and/or the level of temporal resolution, can vary over the course of transmitting the coded image sequence.

In step E800, the processor 200 sets the size of the dataset being formed to the value zero.

In the next step E801, the processor 200 extracts the data subset located at the current position in the datastream being processed, i.e. the coded image sequence being processed.

In the next step E802, the processor 200 checks whether the dataset being formed is non-zero and whether the sum of the size of the dataset being formed and the size of the extracted data subset is strictly greater than a predetermined value. The predetermined value is for example the MTU parameter of the telecommunication network 50.

If all the data being formed is non-zero and if the sum of the size of the dataset being formed and the size of the extracted data subset is strictly greater than the predetermined value, it is not possible to add the extracted data subset to the dataset being formed. The processor 200 interrupts the algorithm of FIG. 8 and returns to step E507 of FIG. 5.

If the sum of the size of the dataset being formed and the size of the extracted data subset is equal to or less than the predetermined value, or if the dataset being formed is empty, the processor 200 passes to step E803.

In step E803, the processor 200 analyses the header of the extracted data subset. When the data subset is an elementary element of an SVC bitstream, the processor 200, in step E804, determines whether the header indicates an SEI (supplemental enhancement information) message and whether the SEI message contained in the subset corresponds to what is called the scalability information SEI message in the document by T. Wiegand, G. Sullivan, J. Reichel, H. Schwarz and M. Wien, "*Scalable Video Coding—Joint Draft* 10 *of SVC Amendment (revision* 2)", Joint Video Team (JVT) of ISO/IEC MPEG & ITU-T VCEG, San Jose, Calif., April 2007.

If the data subset contains a scalability information SEI message, the processor 200 passes to step E805. Otherwise, the processor 200 passes to step E806.

In step E805, the processor 200 decodes the scalability information SEI message intended to describe the organization of the coded image sequence requested.

The scalability information SEI message contains inter alia information indicating the frequencies of images of each level of spatial or quality resolution contained in the coded image sequence requested by the receiving device 20 or, in other words, the levels of temporal resolution contained in the coded image sequence requested.

The decoding of this message provides a table of values of frame rates for each level li of spatial or quality resolution, denoted by framerate[li].

In the next step E806, the processor 200 checks whether the extracted data subset belongs to a new group of images GOP. The processor 200 checks whether the extracted data subset belongs to a new group of images GOP by checking whether the data subset contains data of level of temporal resolution 0 and has a quality index equal to 0.

If the extracted data subset does not belong to a new group of images GOP, the processor 200 passes to step E809. Otherwise, the processor 200 passes to step E807.

In step E807, the processor 200 updates the data subset extraction parameters. In other words, the processor 200 determines the level of spatial and/or quality resolution and the temporal resolution requested in the first RTSP request received.

In the next step E808, the processor 200 determines which data subsets have to be extracted from the new group of images GOP as a function of the new extraction parameters or, in the case of regulation of the bit rate output by the video server 10, the processor 200 analyses the headers of the data subsets present in the new GOP and determines the data subsets which will produce, during reproduction or decoding, the video image sequence of best quality under the current bit rate constraint.

When the data subsets are NAL elementary units, the processor 200 analyses the "priority_id" fields present in the headers of the NALs and such as those described in Sections G.7.3.1 and G.7.4.1 of the document by T. Wiegand, "*Scalable Video Coding—Joint Draft* 10 *of SVC Amendment (revision* 2)", Joint Video Team (JVT) of ISO/IEC MPEG & ITU-T VCEG, San Jose, Calif., April 2007.

In step E809, the processor 200 checks whether the extracted data subset contains data of a level of resolution that contributes to the formation of a new image during decoding of the coded image sequence.

If the extracted data subset contains data of a level of resolution that contributes to the formation of a new image during decoding of the coded image sequence, the processor 200 passes to step E810. Otherwise, the processor 200 passes to step E811.

In other words, the processor 200 detects whether the extracted data subset contains data contributing to the formation of an image for which the previous extracted data subsets did not contribute to the formation.

When the data subset is an elementary element of an SVC bitstream, the processor 200 verifies:
  if the header of the data subset does not contain a sequence parameter set; and
  if the data subset does not contain a picture parameter set; and
  if the data subset does not contain an SEI message supplying information about the next data subset in the bitstream; and
  if the data subset is different from the scalability information SEI message; and
  if the type of data subset is different from the "prefix NAL unit"; and
  if the quality index of the data subset is equal to zero. The abovementioned parameters and messages are described in the document by T. Wiegand, G. Sullivan, J. Reichel, H. Schwarz and M. Wien, "*Scalable Video Coding—Joint Draft* 10 *of SVC Amendment (revision* 2)", Joint Video Team (JVT) of ISO/IEC MPEG & ITU-T VCEG, San Jose, Calif., April 2007.

In step E810, the processor 200 increments the value of a counter Cpt_im(li) associated with the level of spatial or quality resolution li of the data contained in the extracted data subset.

In step E811, the processor 200 checks whether the extracted data subset belongs to the set of levels of resolution that are required by the receiving device 20.

If the extracted data subset does not belong to the set of levels of resolution required by the receiving device 20, the processor 200 passes to step E816. Otherwise, the processor 200 passes to step E812.

In step E812, the processor 200 inserts the extracted data subset into the dataset being formed, and then passes to step E813.

In step E813, the processor 200 checks whether the previously inserted data subset is the first data subset inserted into the dataset or whether the extracted data subset belongs to a new group of images GOP.

If the previously inserted data subset is not the first data subset inserted into the dataset and does not belong to a new group of images GOP, the processor 200 passes to step E816.

If the previously inserted data subset is the first data subset inserted into the dataset or if the extracted data subset belongs to a new group of images GOP, the processor 200 passes to step E814.

In step E814, the processor 200 determines the value of the delay to be applied between the instant of transfer of the previously formed dataset and the dataset being formed.

This step will be described in greater detail with reference to FIG. 8*b*.

According to the invention, the value of the delay is dependent on the number of decoded images that can be formed from the data subsets contained in the previously formed dataset which contain data of the level of resolution or a level of resolution higher than the lowest level of resolution.

According to the invention, the value of the delay is dependent on the number of decoded images that can be formed from the data subsets contained in the previously formed dataset which contain data of the lowest level of resolution.

According to the invention, the value of the delay is furthermore dependent on the maximum rate of reproduction of the decoded images on a display means.

According to the invention, the data subsets of each dataset are ordered and the value of the delay is a minimum if the first data subset included in the dataset being formed contributes to the formation of the same decoded image as the first data subset contained in the previously formed dataset.

According to the invention, when the coded image sequence is decomposed into first and second GOPs, at least first and second datasets have previously been formed, the first and second datasets contain data representative of the first group of coded images and, if the data contained in the dataset being formed are representative of the first group of images, the value of the delay to be applied between sending the second dataset and sending the dataset being formed is determined, or, if the data contained in the dataset being formed are representative of the second group of images, the value of the delay to be applied between sending the first dataset and sending the dataset being formed is determined.

According to the invention, the coded image sequence is furthermore coded according to a first level of temporal resolution and at least a second level of temporal resolution higher than the first level of temporal resolution, and if the data contained in the dataset being formed are representative of the second group of images, the value of the delay to be applied between sending the first dataset and sending the dataset being formed is a function of the first level of temporal resolution.

In step E815, the processor 200 stores the calculated instant of sending as being the previous instant of sending.

In the next step E816, the processor 200 checks whether the entire video stream has been processed. If the entire video stream has been processed, the processor 200 stops the present algorithm. Otherwise, the processor 200 returns to step E801.

In step E820 of FIG. 8b, the processor 200 checks whether the extracted data subset belongs to a new group of images GOP and whether the counter Cpt_im_t0[li] is equal to or greater than 2. The counter Cpt_im_t0[li] counts the number of images of temporal resolution 0 counted in the extracted NAL data subsets.

If the extracted data subset belongs to a new group of images GOP and if the counter Cpt_im_t0[li] is equal to or greater than 2, the processor 200 passes to step E823.

If the extracted data subset does not belong to a new group of images GOP or if the counter Cpt_im_t0[li] is less than 2, the processor 200 passes to step E821.

In step E821, the processor 200 calculates the delay according to the following equation:

$$\text{Delay} = \frac{\max\{currentCpt\_im[li]\} - \max\{previousCpt\_im[li]\}}{\max\{framerate[li]\}}$$

in which $\max\{currentCpt\_im[li]\}$ is the maximum value of the image counters Cpt_im[li] of each level of resolution li of the dataset being formed, $\max\{previousCpt\_im[li]\}$ is the maximum value of the image counters Cpt_im[li] of each level of resolution the value of which is taken at the first data subset of the previously formed dataset, and $\max\{framerate[li]\}$ is the maximum frame rate for images having the levels of spatial or quality resolution that are required by the customer.

In the next step E822, the processor 200 checks whether the extracted data subset belongs to a new group of images GOP.

If the extracted data subset belongs to a new group of images GOP, the processor 200 passes to step E824. Otherwise, the processor 200 passes to step E825.

In step E823, the processor 200 calculates the delay according to the following equation:

$$\text{Delay} = \frac{1}{frameratet l0[li]}$$

in which frameratetl0[li] is the frequency of the image of the lowest level of temporal resolution.

The instant of sending is equal to the sum of the delay and of the instant of sending of the previous dataset which contained a data subset of the lowest level of temporal resolution.

Having carried out this operation, the processor 200 passes to step E824.

In step E824, the processor 200 stores the calculated instant of sending as being the instant of sending the previous dataset that contained a data subset of the lowest level of temporal resolution.

Having carried out this operation, the processor 200 passes to the next step E825.

In the next step E825, the processor 200 increments the counter Cpt_im_t0[li] by one unit.

Having carried out this operation, the processor 200 returns to step E816 of the algorithm of FIG. 8a.

Of course, the present invention is in no way limited to the embodiments described here, rather it encompasses, quite to the contrary, any variant within the competence of a person skilled in the art and in particular the combination of various embodiments of the present invention.

In an alternative embodiment, the delay calculation of step E823 would be activated only when a NAL from the H.264/AVC compliant base layer is encountered. More precisely, in this embodiment the test in step E820 of FIG. 8b is modified. In the modified test E820, the processor 200 checks whether the extracted data subset belongs to a new group of images GOP, whether the counter Cpt_im_t0[li] is equal to or greater than 2, and whether the resolution li of the considered NAL is equal to zero. If the extracted data subset belongs to a new group of images GOP and if the counter Cpt_im_t0[li] is equal to or greater than 2 and if the resolution li is equal to zero, the processor 200 passes to step E823. This last embodiment is particularly adapted to cases where the number of transmitted SVC layers would evolve during the video transmission session.

The invention claimed is:

1. A method implemented by a device for determining a value of a delay to be applied between sending a first dataset and sending a second dataset, from a sender device to a receiver device over a network, the method comprising:
   obtaining the first and second datasets, the first and second datasets containing data corresponding to data subsets, which data is representative of a sequence of coded images, the coded images being coded according to a first level of resolution and at least a second level of resolution higher than the first level of resolution, the data subsets containing data of a single level of resolution; and
   determining the value of the delay to be applied between sending of the first and second datasets, from the sender device to the receiver device over the network, the value of the delay being dependent on a number of decoded images that can be formed from the data subsets of the first dataset, which data subsets contain data of the second level of resolution,
   wherein the value of the delay between sending of the first and second datasets, from the sender device to the receiver device over the network, is a minimum if the first data subset included in the second dataset contributes to formation of a same decoded image as the first data subset included in the first dataset.

2. The method according to claim 1, wherein the value of the delay is dependent on the number of decoded images that can be formed from the data subsets of the first dataset which contain data of the first level of resolution.

3. The method according to claim 2, wherein the value of the delay is furthermore dependent on a maximum rate of reproduction of the decoded images on a display means.

4. The method according to claim 1, wherein the first and second levels of resolution are levels of spatial or quality resolution and in that the value of the delay is dependent on the number of decoded images that can be formed from the data subsets of the first dataset which contain data of the second level of spatial or quality resolution.

5. The method according to claim 1, further comprising:
detecting each data subset of the first dataset containing data contributing to the formation of an image for which previous data subsets do not contribute to the formation; and
for each data subset detected, incrementing a value of a counter associated with the level of resolution of the data contained in the subset detected,
and wherein the value of the delay is dependent on the number of decoded images that can be formed from the subsets of the first dataset which contain data of the level of resolution of which the associated counter has the maximum value.

6. The method according to claim 1, wherein the sequence of coded images is decomposed into a first group and a second group of coded images, the first and second datasets containing data representative of the first group of coded images, and the method further comprises:
obtaining a third set of representative data; and
if the data contained in the third dataset are representative of the first group of images, determining the value of the delay to be applied between sending the second dataset and sending the third dataset or, if the data contained in the third dataset are representative of the second group of images, determining the value of the delay to be applied between sending the first dataset and sending the third dataset.

7. The method according to claim 6, wherein the sequence of coded images is furthermore coded according to a first level of temporal resolution and at least one second level of temporal resolution higher than the first level of temporal resolution and, if the data contained in the third dataset are representative of the second group of images, the value of the delay to be applied between sending the first dataset and sending the third dataset is a function of the first level of temporal resolution.

8. The method according to claim 1, wherein the datasets are obtained so as to contain a quantity of data below a predetermined threshold.

9. A device for determining a value of a delay to be applied between sending a first dataset and sending a second dataset, from a sender device to a receiver device over a network, wherein the device comprises:
means for obtaining the first and second datasets, the first and second datasets containing data corresponding to data subsets, which data is representative of a sequence of coded images, the coded images being coded according to a first level of resolution and at least a second level of resolution higher than the first level of resolution, the data subsets containing data of a single level of resolution; and
means for determining the value of the delay to be applied between sending of the first and second datasets, from the sender device to the receiver device over the network, the value of the delay being dependent on a number of decoded images that can be formed from the data subsets of the first dataset which data subsets contain data of the second level of resolution, wherein the value of the delay between sending of the first and second datasets, from the sender device to the receiver device over the network, is a minimum if the first data subset included in the second dataset contributes to formation of a same decoded image as the first data subset included in the first dataset.

10. A non-transitory computer-readable information medium storing a program, which, when it is loaded into and executed by a computer or a processor in a device, allows the device to implement a method for determining a value of a delay to be applied between sending a first dataset and sending a second dataset, from a sender device to a receiver device over a network, the method comprising:
obtaining the first and second datasets, the first and second datasets containing data corresponding to data subsets, which data is representative of a sequence of coded images, the coded images being coded according to a first level of resolution and at least a second level of resolution higher than the first level of resolution, the data subsets containing data of a single level of resolution; and
determining the value of the delay to be applied between sending of the first and second datasets, from the sender device to the receiver device over the network, the value of the delay, the value of the delay being dependent on a number of decoded images that can be formed from the data subsets of the first dataset, which data subsets contain data of the second level of resolution,
wherein the value of the delay between sending of the first and second datasets, from the sender device to the receiver device over the network, is a minimum if the first data subset included in the second dataset contributes to formation of a same decoded image as the first data subset included in the first dataset.

11. A device for determining a value of a delay to be applied between sending a first dataset and sending a second dataset, from a sender device to a receiver device over a network, wherein the device includes at least one processor configured to:
obtain the first and second datasets, the first and second datasets containing data corresponding to data subsets, which data is representative of a sequence of coded images, the coded images being coded according to a first level of resolution and at least a second level of resolution higher than the first level of resolution, the data subsets containing data of a single level of resolution; and
determine the value of the delay to be applied between sending of the first and second datasets, from the sender device to the receiver device over the network, the value of the delay, the value of the delay being dependent on a number of decoded images that can be formed from the data subsets of the first dataset, which contain data of the second level of resolution,
wherein the value of the delay between sending of the first and second datasets, from the sender device to the receiver device over the network, is a minimum if the first data subset included in the second dataset contributes to formation of a same decoded image as the first data subset included in the first dataset.

* * * * *